Figure 1:
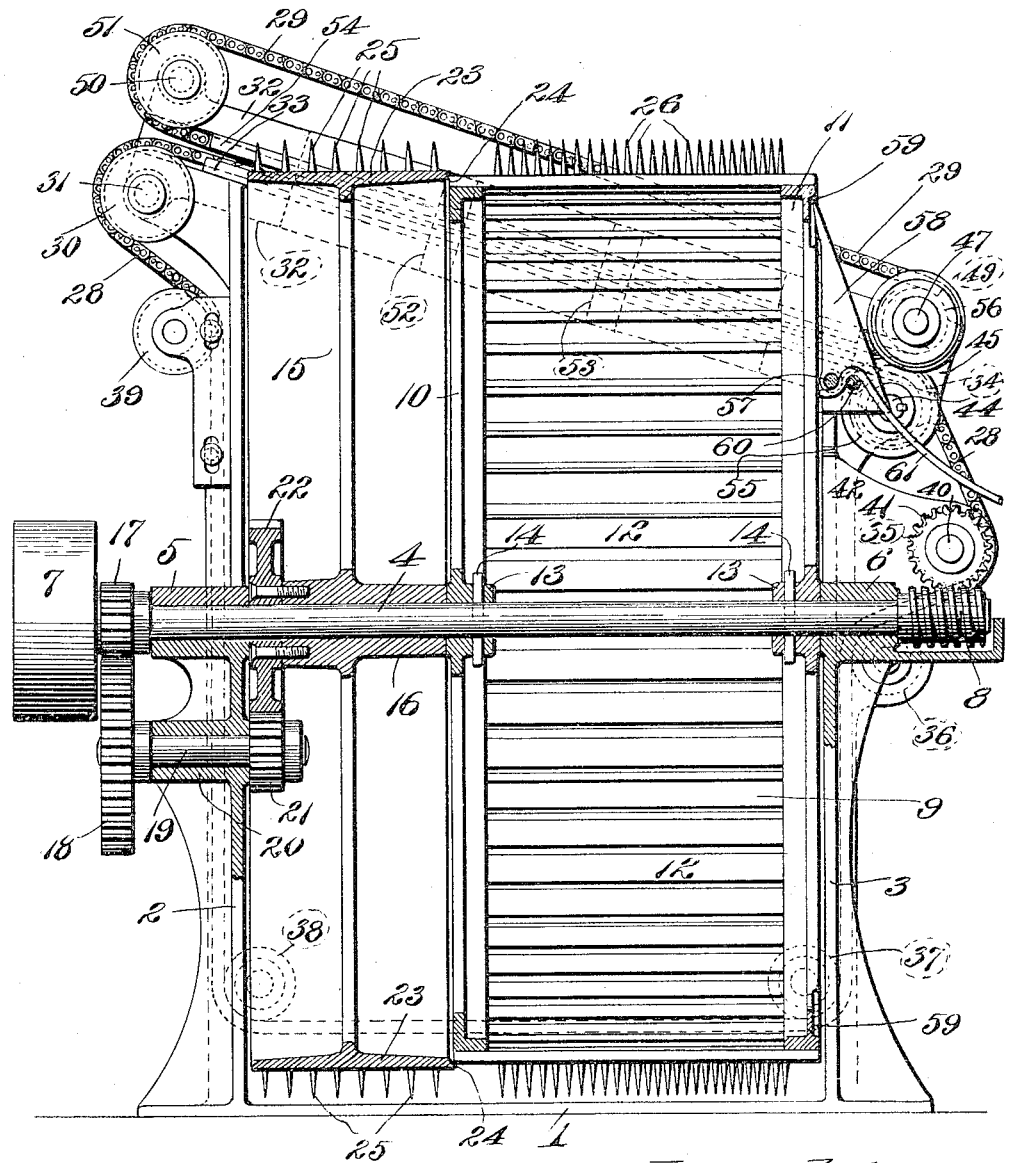

W. J. HOLLIER.
MACHINE FOR DECORTICATING FIBROUS PLANTS.
APPLICATION FILED SEPT. 2, 1913.

1,127,439.

Patented Feb. 9, 1915.

3 SHEETS—SHEET 1.

Attest:
Wm. H. Scott
Stella Hill

Inventor:
Walter J. Hollier,
by Bruce S. Elliott
Atty.

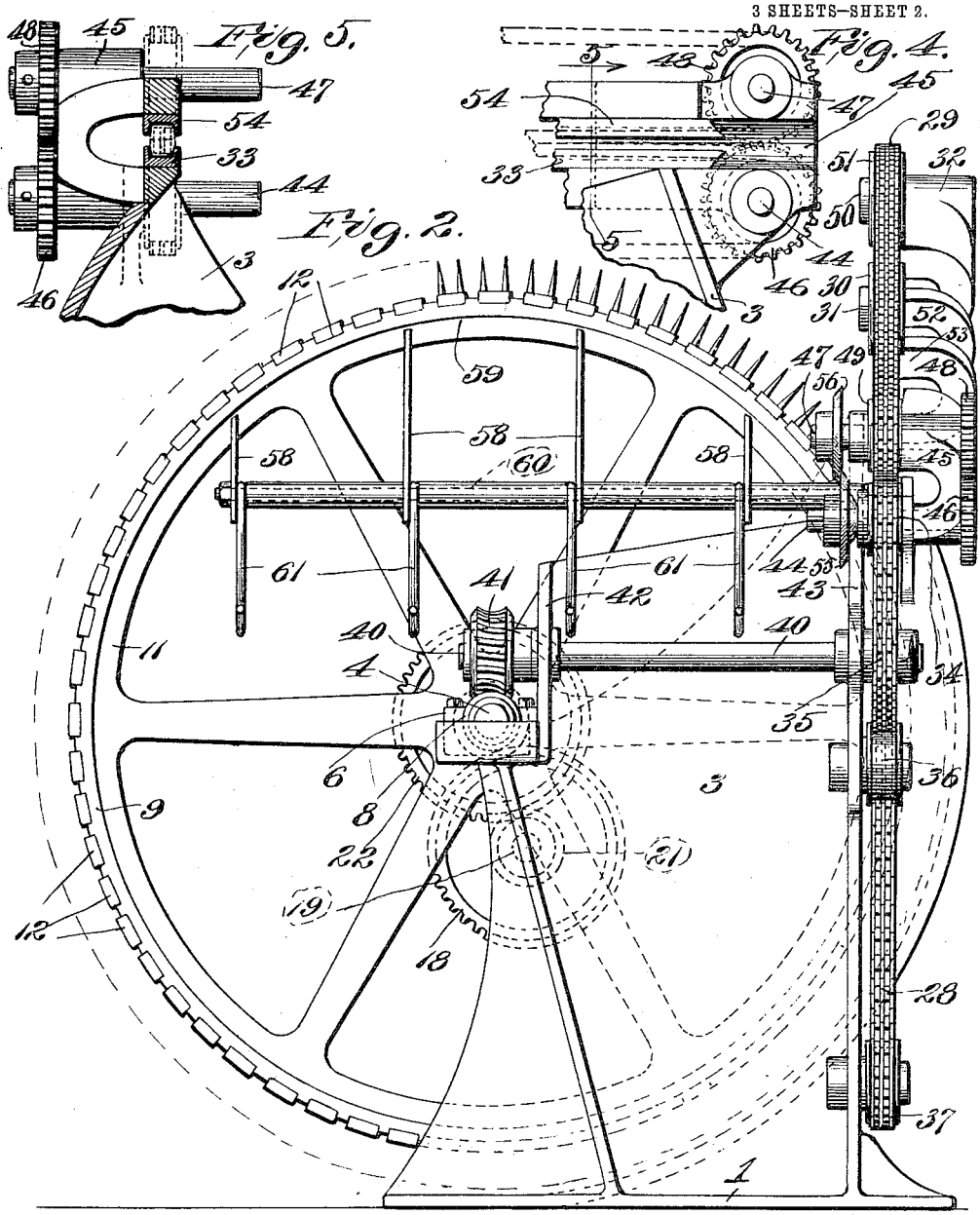

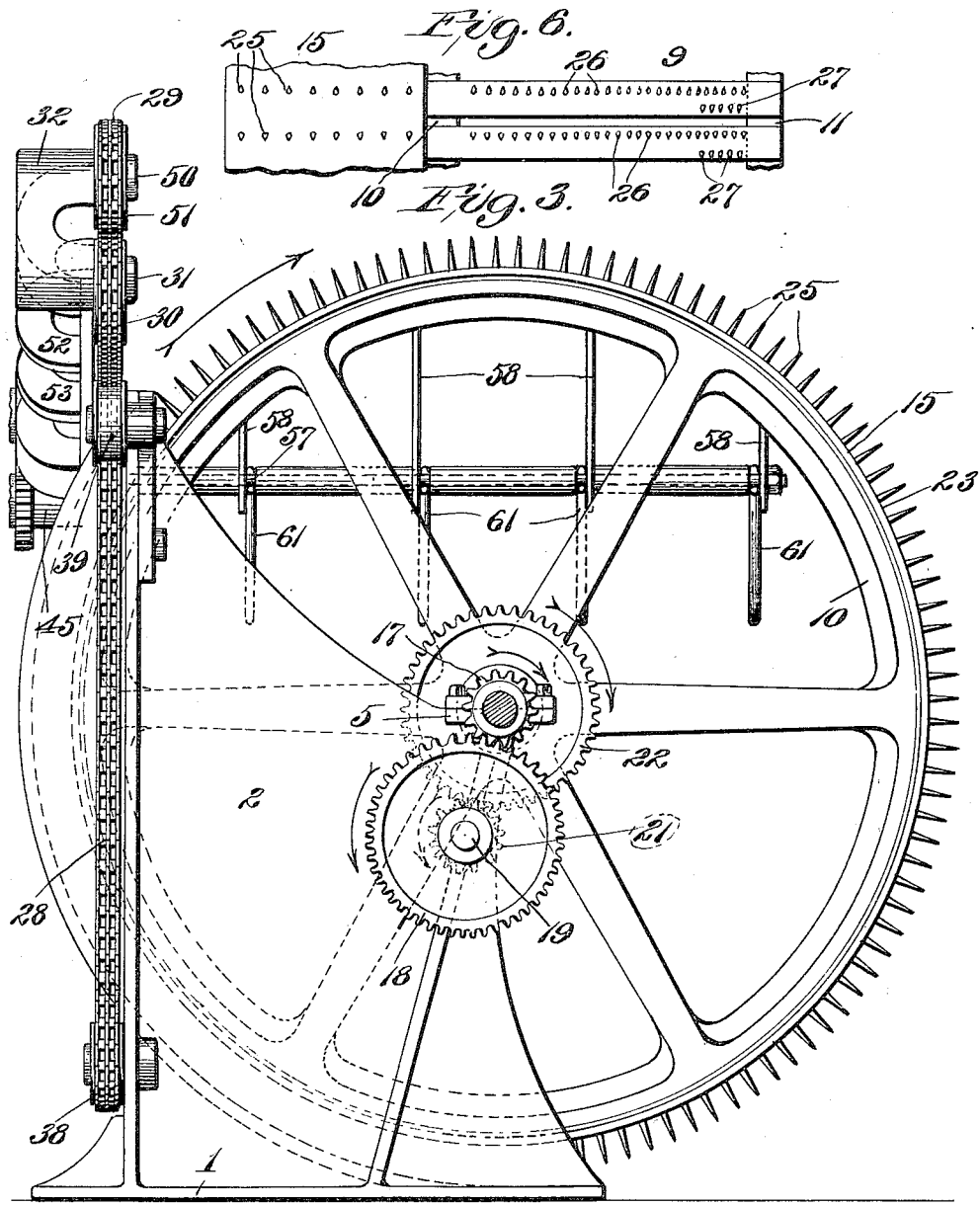

UNITED STATES PATENT OFFICE.

WALTER JOHN HOLLIER, OF ST. LOUIS, MISSOURI.

MACHINE FOR DECORTICATING FIBROUS PLANTS.

1,127,439.   Specification of Letters Patent.   Patented Feb. 9, 1915.

Application filed September 2, 1913. Serial No. 787,631.

*To all whom it may concern:*

Be it known that I, WALTER JOHN HOL-LIER, a subject of the King of Great Britain, residing in the city of St. Louis and State of Missouri, have invented new and useful Improvements in Machines for Decorticating Fibrous Plants, of which the following is a specification.

This invention relates to certain new and useful improvements in machines for recovering fiber from plants, and is particularly adapted for use in decorticating the leaves of the Manila (abaca) plant, and the plant known as New Zealand flax (*Phormium tenax*). I have heretofore devised a machine for decorticating fibrous plants in which a pin cylinder of a given diameter is mounted on the same shaft with a pin cylinder of a smaller diameter and of less length, said cylinders traveling at the same rate of speed, and the larger cylinder being for the purpose of decorticating the major portion of the plant or stalk, while the smaller cylinder was for the purpose of acting upon the butt end of the stalk. Such machine is shown and described in my pending application, Ser. No. 713,220, filed August 5th, 1912.

The machine described in the above mentioned application has been operated successfully with certain plants, but in recent experiments conducted personally in the Philippine Islands, I have discovered that it is impracticable to at once subject the long Manila leaf to the action of the pins of a rapidly revolving cylinder for the reason that as the leaf very seldom lies perfectly straight on the cylinder, that is to say, with its fibers running parallel with the sides of the cylinder, the pins on the cylinder, instead of shredding the leaf, will cut across the fibers and break them off, with the result that the fibers ultimately recovered will be much shorter in length than they were naturally, and there will be a consequent shortage in the amount of fiber theoretically recoverable from the plant. To overcome this objection I have devised the machine shown in the present application in which the plant is first subjected to the action of a relatively slowly revolving cylinder provided with pins spaced at a relatively wide distance apart, which, in operation, will act to cut or shred the leaf along the lines of the fiber, without, however, to any very considerable extent, removing the surrounding pulpy portion in which the fibers are embedded. In close proximity to this cylinder I provide a wider cylinder having the pins thereon arranged somewhat closer together than on the first cylinder, said second cylinder being revolved at a high rate of speed so that as the shredded plant or leaf passes on to this second cylinder the pins thereon will pass between the fibers and operate to remove the adhering material therefrom, with a rubbing or brushing action, with practically no liability to cut or break the fibers. As the result, the total length of fiber is recovered, in a thoroughly clean condition, and consequently waste is reduced to the minimum.

Having thus outlined the general purpose of the invention I will now proceed to describe the same in detail, having reference to the accompanying drawings, in which—

Figure 1 is a vertical sectional view through a machine constructed according to my invention, the feed table for conveying the plants to the feed chains being removed, for the sake of clearness in illustration; Fig. 2 is a view in end elevation looking at the machine from the right-hand side of Fig. 1; Fig. 3 is a view similar to Fig. 2, but viewed from the left-hand side of Fig. 1; Fig. 4 is a fragmentary view showing the inner side of the yoke for supporting the channels for the feed chains, the sprocket wheels driving the same, and the disk cutters for cutting off the butt ends of the leaves or stalks, the feed chains and sprocket being shown in dotted lines, and the cutters being removed for the sake of clearness of illustration; and the parts being shown in a horizontal instead of an inclined position; Fig. 5 is a view in end elevation of the same parts, the same being substantially a section taken on the line 5—5 of Fig. 4; and Fig. 6 is a fragmentary view showing a portion of the two cylinders to illustrate the relative arrangement of pins thereon.

Referring now to the drawings, the machine as a whole is supported in a hollow frame comprising a base 1, and end plates 2, 3, which provide bearings and supports, as hereinafter referred to, for the greater portion of the running parts of the machine, and which plates are connected at the rear to partially inclose the cylinders.

The numeral 4 indicates the main drive shaft, which is supported near its outer ends in bearings 5, 6, provided in the frame plates 2, 3. On one end of this shaft is mounted a drive pulley 7, and on the other end is provided a worm 8.

The numeral 9 indicates, generally, the main decorticating cylinder which is composed of heads 10, 11, connected by a series of bars 12. The cylinder 9 is provided with hubs 13 through which, and the shaft 4, extend pins 14, by means of which it is made fast on the shaft. The cylinder 9 is driven direct, therefore, from the pulley 7 by the shaft 4. The numeral 15 indicates a second cylinder which is provided with a hub 16 loosely mounted on the shaft 4, so that the said cylinder is free to revolve on the shaft. Adjacent to the pulley 7 I provide on the shaft 4 a spur gear 17 which is in mesh with a gear wheel 18 secured on one end of a short shaft 19, which is mounted in a bearing 20 provided on the end plate 2. At its opposite end the shaft 19 is provided with a spur gear 21 which is in mesh with the gear wheel 22 secured on the end of the hub 16. Through the gears described the cylinder 15 is driven from the shaft 4, and the relation of the gears is such that the cylinder 15 will be revolved at about one-tenth the speed of the cylinder 9. The periphery 23 of the cylinder 15 is preferably of metal, and said cylinder is of slightly greater diameter than the cylinder 9 so that a portion of its periphery may overlap the inner portion of the periphery of the cylinder 9, as indicated at 24, to prevent material from passing between them. The outer periphery of the cylinder 15 is provided with rows of pins 25, said pins being in alinement and being preferably spaced about seven-eighths of an inch apart. The bars 12 of the main cylinder 9 are each provided with a row of pins 26 which, at a point adjacent to the cylinder 15, are spaced approximately a half an inch apart, this distance being gradually decreased toward the outer end where they are about one-fourth of an inch apart. Each row of pins 26 is in line with a row of pins 25. Toward the outer end each of the bars 12 is provided with several pins 27, five of such pins being shown in the drawing, (see Fig. 6), which are in staggered relation with the pins 26. The purpose of putting the pins 26 closer together as the outer or finishing end of the cylinder is approached, and of providing the auxiliary pins 27, is to provide a greater decorticating action upon the plant, and thus thoroughly clean the fiber, which increased action is permitted without danger of breaking the fibers by reason of the fact that the same will have been more and more deprived of adhering matter as they approach the finishing end of the cylinder 9, and will thus permit the ready passage of the teeth 26 and 27, arranged as described, between them. The action of these teeth on the fibers is very direct and intimate, and results in removing all remaining adhering matter from the fiber.

The cylinder 15 in practice is about eight inches in width, and the cylinder 9 about fifteen inches in width. As indicated in the statement of the general objects of the invention, the cylinder 15 is for the purpose of placing the leaf in condition for the decorticating action of the cylinder 9, the pins 25 of the former cylinder acting merely to shred the leaf, which permits the more intimate action of the teeth 26 of the main or decorticating cylinder without liability of cutting or breaking the fiber.

In order to feed the leaves over the two cylinders I provide two feed chains 28 and 29. Beginning at the left-hand of the machine, as shown in Fig. 1, the feed chain 28 passes over an idler 30 which is mounted on a stub shaft 31 projecting from the lower side of a yoke 32, and thence passing over and within a guide channel 33, it passes over a sprocket wheel 34 (Fig. 2), thence over a sprocket wheel 35, thence over idlers 36, 37, 38 and 39, to the idler 30. The sprocket wheel 35 is mounted on the outer end of a shaft 40, the inner end of which is provided with a worm gear 41 in mesh with the worm 8 of the shaft 4. The shaft 40 is mounted in brackets 42, 43, extending at right angles to the end plate 3, as shown. The idler sprocket 34 is mounted on a stub shaft 44 projecting from the lower side of a yoke 45 corresponding to the yoke 32, and on said stub shaft is mounted a gear wheel 46. Extending from the other leg of the yoke is a stub shaft 47 on which is mounted a gear wheel 48 which is in mesh with the gear wheel 46. On the stub shaft 47 there is also mounted a sprocket wheel 49. Projecting inward from the upper side of the yoke 32 there is a stub shaft 50 on which is mounted an idler sprocket 51, and over the idlers 49 and 51 passes the feed chain 29. Extending between the yoke 32 at the upper end of the feed device and the yoke 45 at the lower end is a lower channel guide 33, before referred to, which is likewise supported on the lower legs of yokes 52 and 53 suitably secured with the yokes 32 and 45 on the frame of the machine. A similar channel guide 54 extends between the yokes 32 and 45, and is supported by the upper legs of said yoke and by the yokes 52 and 53. The chain 29 in the portion of its traverse opposite the chain 28 travels in the guide 54 in parallel relation with the chain 28, and said guides not only act to guide these chains, but serve the purpose of preventing them from separating in action so as to release their grip upon the material passed between them. As will be understood, the sprocket wheel 35 drives the sprocket chain 28, and this chain, through the medium of the sprocket wheel 34, drives the gear 46, which, through the medium of the gear 48, drives the sprocket wheel 49, and consequently the chain 29. The gear wheels 46 and 48, and the sprocket wheels 34 and 49 are fast on the respective stub shafts 44 and 47, the latter being mounted on the yoke 45 to revolve in suitable bearings, and mounted on these respective shafts are disk cutters 55 and 56 which rotate in close proximity in the ordinary manner, and serve to sever from the leaf that portion of the stalk gripped between the chains 28 and 29. Mounted at one end on the head 3 is a rod 57 which supports a series of tapered guards 58, the tapered end of which extends upward beneath a projecting annular flange 59 forming part of the periphery of the head 11. Extending through and supported in the guards 58 is a second rod 60 running parallel to the rod 57, but at a distance therefrom.

The numerals 61 indicate a series of curved arms which have upper bent ends adapted to be passed over the bar 60 and under the bar 57 and thus be held in position. The purpose of these arms is to receive the fiber as it passes off of the cylinder 9, and the purpose of the guards 58 is to direct the fiber on to these arms, and prevent it from falling directly downward and becoming entangled with any part of the operating mechanism.

In operation the butt ends, or stalks, of the leaves are inserted between the chains 28 and 29 at the upper end of Fig. 1, a feed table (not shown) being preferably employed to support the outer ends of the leaves, and such stalks or butt ends are gripped between the two chains and the leaves in succession fed over the cylinder 15, the butt ends being caused to travel on a downward incline, as shown by Fig. 1. During this operation the pins 25 will pierce the leaf and shred it, that is to say, cut it into narrow strips, after which the shredded leaf passes on to the rapidly revolving cylinder 9 where the pins 26 operate in a gradually increasing manner to remove the outer husk from about the fibers and to brush and comb the same so that the fibers will pass from the cylinder entirely clean and be carried over the guards 58 by the feed chains and fall on the arms 61, whence they are removed by an operator.

The drawings herein illustrated, and the above specification describe the machine substantially as I have constructed and operated it, and is the best embodiment of the invention now known to me. I desire it to be understood, however, that, except as may be indicated in the claims, I do not wish to be limited to the precise details of construction shown, as it is obvious the same can be varied or modified in many ways without departing from the principal idea of the invention, which consists in the provision of the two cylinders constructed and operated as described.

I claim:

1. In a machine for recovering fiber from plants, in combination with two decorticating cylinders arranged to rotate in endwise juxtaposition, means for rotating said cylinders at different rates of speed, and means for conveying the plant to be decorticated first over the cylinder rotating at the slower rate of speed and then over the other cylinder.

2. In a machine for recovering fiber from plants, in combination with two decorticating cylinders arranged to rotate in endwise juxtaposition, means for causing said cylinders to rotate at different rates of speed, and means for conveying the plants to be decorticated first over the cylinder rotating at the slower rate of speed, then over the other cylinder, said conveying means being mounted to travel in a downwardly inclined direction from the beginning of the feed to the end.

3. In a machine for recovering fiber from plants, in combination with two cylinders arranged to rotate in juxtaposition, means for causing said cylinders to rotate at different rates of speed, means for conveying plants first over the cylinder rotating at the slower rate of speed, and then over the other cylinder, and cutting devices at the termination of said conveying means for severing the butt ends of the plants.

4. In a machine for recovering fiber from plants, in combination with a frame having a shaft rotatably mounted therein, a decorticating cylinder fast on said shaft, a second cylinder loosely mounted on said shaft in juxtaposition to the first cylinder, gear mechanism operatively connecting said shaft with said second cylinder, and so proportioned as to drive the second cylinder from the shaft at a slower rate of speed than the first cylinder, shredding members arranged about the periphery of said second cylinder, and means for conveying plants first over the slower rotating cylinder and then over the first or main decorticating cylinder.

5. In a machine for recovering fiber from plants, in combination with two cylinders mounted to rotate in juxtaposition, means for rotating said cylinders at different rates of speed, and means for conveying plants over first the slower rotating cylinder and then over the other cylinder, the slower rotating cylinder having pins arranged about its periphery at relatively wide distances apart, and the rapidly rotating, or main decorticating, cylinder, having rows of pins arranged around its periphery in closer relation to each other than the pins on its companion cylinder.

6. In a machine for recovering fiber from plants, in combination with two cylinders mounted to rotate in juxtaposition, means for rotating said cylinders at different rates of speed, and means for conveying plants over first the slower rotating cylinder and then over the other cylinder, the slower rotating cylinder having pins arranged about its periphery at relatively wide distances apart, and the rapidly rotating, or main decorticating, cylinder having rows of pins arranged around its periphery in closer relation to each other than the pins on its companion cylinder, and gradually decreasing in distance from each other toward the finishing end of the cylinder.

7. In a machine for recovering fiber from plants, in combination with two cylinders arranged to rotate in juxtaposition, the first cylinder having a portion of its periphery slightly overlapping the periphery of the second cylinder, means for rotating said cylinders and for causing the first cylinder to travel at a slower rate of speed than the second cylinder, shredding members provided about the periphery of the first cylinder, decorticating members provided about the periphery of the second cylinder, and means for conveying plants first over the first cylinder, and then directly on to and over the second cylinder.

8. In a machine for recovering fiber from plants, in combination with a decorticating cylinder and means for rotating the same, means for conveying plants over said cylinder, guards mounted at the finishing end of said cylinder for directing the fall of the finished fiber outward from the cylinder, and receiving members mounted on said guards.

In testimony whereof, I have hereunto set my hand in presence of two subscribing witnesses.

WALTER JOHN HOLLIER.

Witnesses:
 BRUCE S. ELLIOTT,
 G. A. PENNINGTON.

Copies of this patent may be obtained for five cents each, by addressing the "Commissioner of Patents, Washington, D. C."